UNITED STATES PATENT OFFICE.

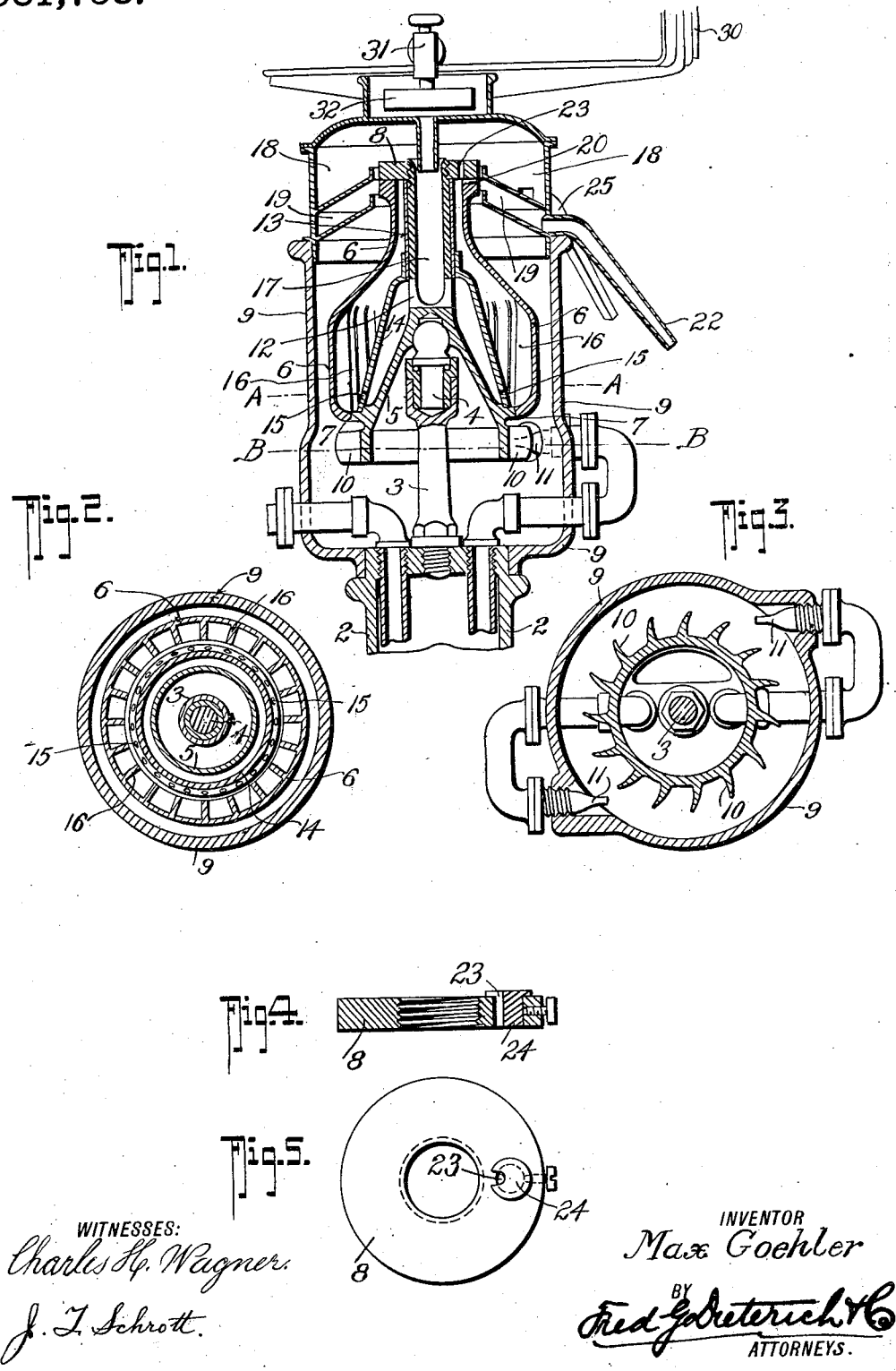

MAX GOEHLER, OF VANCOUVER, BRITISH COLUMBIA, CANADA.

MILK-SEPARATOR.

981,758.  Specification of Letters Patent.  Patented Jan. 17, 1911.

Application filed February 23, 1910. Serial No. 545,338.

*To all whom it may concern:*

Be it known that I, MAX GOEHLER, citizen of the Swiss Republic, residing at Vancouver, in the Province of British Columbia, Canada, have invented a new and useful Milk-Separator, of which the following is a specification.

This invention relates to a centrifugal cream separator of that class wherein the whole milk is run into a rapidly revolving bowl and the separated milk and cream are continuously delivered therefrom through separate outlets under the influence of centrifugal force.

The improvements are directed to the application of a high speed rotating means direct to the body of the separator bowl so that the intervention of multiplying mechanism is dispensed with, also to the manner of yielding by mounting the separator bowl adjacent to its center of gravity, on the head of the pivot pin on which it rotates, so as to afford the bowl an opportunity for adjusting itself during rotation.

The invention also comprises features in the construction of the bowl itself by which the entering milk is compelled to take up at once the rotatory movement of the vessel. There are also certain subsidiary novel features in the construction of the bowl which renders the interior more readily accessible for cleaning.

The invention is particularly described in the following specification, reference being made to the drawings by which it is accompanied, in which:

Figure 1 is a vertical section through the separator bowl and its attached and connected parts, Fig. 2, a cross section on the line A A, Fig. 3, a cross section on the line B B, and Figs. 4 and 5, details to an enlarged scale in section and plan of the adjustable cream outlet from the bowl.

In these drawings 2 represents the head of the column on which the separator is mounted and which sustains it at a convenient height from the floor, 9 being a casing, inclosing the bowl and its motor, which casing is removably socketed water tight upon the head of the column 2 and supports the cream and skim milk receiving vessels 18 and 19.

The separator bowl is formed of two parts 5 and 6, detachable for convenience in cleaning. The inner part 5 comprises a hollow cylindrical stem portion which is conically enlarged toward the lower end and from the lower part of which enlargement downwardly projects an impact turbine 10 by which a direct rotatory movement is imparted to the bowl by jets of a fluid under pressure directed on the vanes of the turbine from nozzles 11 on diametrically opposite sides. The outer part 6 of the separator bowl is jointed at 7 onto a conical seat of the inner part immediately above the turbine. This outer portion 6 converges toward the upper end to a contracted neck upon the upper end of which bears a nut 8 threaded upon the neck of the inner portion 5 which nut secures the outer and inner portion together to form the bowl.

Around the inside of the enlarged portion of the outer part 6 of the bowl are a number of inwardly projecting vanes 16 which taper slightly from the lower to the upper end. These vanes form a most important part of my invention and by their use I am enabled to dispense with the conical laminæ commonly used in separator bowls. These vanes may be integral with or secured to the body of the bowl and may be radial or inclined slightly from the radial line as drawn. The separator bowl thus formed is pivotally mounted on the spherical upper end of a pin 4 stepped into a bearing in the upper end of a support 3 projecting upward axially from the head 2 of the column, the bearing of the pin 4 being provided in the support 3 with a ball race to reduce the friction.

Removably mounted on the cylindrical portion of the bowl inner member 5 is a sleeve 13 to the lower end of which just above the lateral apertures 12 from the hollow of the stem is secured an outwardly coned baffle 14 which seats upon the bottom of the bowl adjacent to the conical seat 7. This baffle 14 is provided around its lower edge with a series of apertures 15 for delivery of the whole milk to the lower part of the bowl.

In the seat of the nut 8 on the upper end of the outer portion 6 of the bowl is cut a passage 20 through which the skim milk occupying the outer part of the bowl during rotation, passes into the receiving vessel 19 for delivery through the spout 22, and in the nut 8 is an aperture 23 at a smaller radial distance for delivery of the cream which passes into its receiving vessel 18 for delivery through the spout 25.

Figs. 4 and 5 show in enlarged detail how this cream exit may be adjusted in its radial distance to enable the quality of the cream to be regulated. This end is attained by forming the aperture 23 as a groove in the outside of a bushing 24 rotatable in a drilled aperture of the nut 8. The bushing may thus be rotated and the radial distance of the aperture 23 varied within the limit of the diameter of the bushing. The bushing may be secured in any position of adjustment by means of a set screw.

In use the whole milk from the vessel 30 is delivered in the usual way through a stopcock 31 and float check 32 to the central passage 17 of the separator bowl. From there it passes through the lateral apertures 12 and constrained by the baffle 14 is delivered into the bottom of the bowl through the apertures 15. Throughout this movement in contact with rotating parts it may derive some movement of rotation and when delivered through the apertures 15 it is constrained by the internal vanes 16 to take up at once the complete rotatory movement of the bowl. The milk and cream separated by the centrifugal force pass respectively through 20 and 23 and are delivered through their respective spouts 22 and 25.

The important features of the invention are, the direct application of the high speed rotating means to the separator bowl, the manner of mounting the bowl adjacent to its center of gravity on the head of the pin on which it rotates so that the bowl is free to adjust itself to its true center of gyration; and the general simplicity of construction by which the parts of the bowl are rendered accessible for cleaning. There is also the means by which the grade of cream as delivered from the bowl may be varied.

Having now particularly described my invention and the manner of its operation, I hereby declare that what I claim as new and desire to be protected in by Letters Patent is:

1. In a centrifugal milk separator, a column support, a bearing mounted on said column support, a separating bowl having a pin to enter said bearing, said separating bowl comprising an inner member consisting of a tubular stem or neck having a conical enlargement at its lower end, and provided with an annular coniform seat on said lower end, said bowl including an outer member having an enlarged body provided with an opening in its bottom having a coniform seat to engage the coniform seat of the inner member, said outer member having a restricted neck into which the reduced neck of the inner member projects, the neck of said outer member being spaced from the neck of said inner member, said inner member neck being longer than said outer member neck and terminating at its upper end in a threaded portion, a nut on said threaded portion to bear against said outer neck and retain said outer and inner members with the conical seats in engagement with one another, said inner neck having apertures to deliver milk into the outer member, said inner neck having a central passage for conveying milk to said apertures, a conical baffle held between said inner and outer members, a sleeve on said inner member neck and secured to said baffle to support the same, said baffle having apertures at its lower end and being spaced from the conical enlargement of said inner member, said outer member having a plurality of radial vanes projecting inwardly from the wall of said outer member, said outer member neck having radial apertures through which the skimmed milk is delivered, said nut having a hole through which the cream may be discharged, said inner bowl member having an impact turbine integrally formed with and below said conical enlargement and fluid nozzles for directing a stream of fluid against said turbine.

2. In a centrifugal milk separator, a column support, a bearing mounted on said column support, a separating bowl having a pin to enter said bearing, said separating bowl comprising an inner member consisting of a tubular stem or neck having a conical enlargement at its lower end, and provided with an annular coniform seat on its lower end, said bowl including an outer member having an enlarged body provided with an opening in its bottom having a coniform seat to engage the coniform seat of the inner member, said outer member having a restricted neck into which the threaded neck of the inner member projects, the neck of said outer member being spaced from the neck of the said inner member, said inner member neck being longer than said outer member neck and terminating at its upper end in a threaded portion, a nut on said threaded portion to bear against said outer neck and retain said outer and inner members with their conical seats in engagement with one another, said inner neck having apertures to deliver milk into the outer member, said inner neck having a central passage for conveying milk to said apertures, a conical baffle held between said inner and outer members, a sleeve on said inner member neck and secured to said baffle to support the same, said baffle having apertures at its lower end and being spaced from the conical enlargement of said inner member, said outer member having a plurality of radial vanes projecting inwardly from the wall of said outer member, said outer member neck having radial apertures through which the skimmed milk is delivered, said nut having a hole through which the cream may be discharged, a bushing in said hole, said bushing having a groove through which the cream passes, means for adjustably holding said bushing in said hole, said inner bowl member having an impact turbine integrally formed with and below said conical enlargement and fluid nozzles for directing a stream of fluid against said turbine.

3. In a centrifugal milk separator, a column support, a bearing mounted on said column support, a separating bowl having a pin to enter said bearing, said separating bowl comprising an inner member consisting of a tubular stem or neck having a conical enlargement at its lower end, and provided with an annular coniform seat on said lower end, said bowl including an outer member having an enlarged body provided with an opening in its bottom having a coniform seat to engage the coniform seat of the inner member, said outer member having a restricted neck into which the reduced neck of the inner member projects, the neck of said outer member being spaced from the neck of said inner member, said inner member neck being longer than said outer member neck and terminating at its upper end in a threaded portion, a nut on said threaded portion to bear against said outer neck and retain said outer and inner members with the conical seats in engagement with one another, said inner neck having apertures to deliver milk into the outer member, said inner neck having a central passage for conveying milk to said apertures, a conical baffle held between said inner and outer members, a sleeve on said inner member neck and secured to said baffle to support the same, said baffle having apertures at its lower end and being spaced from the conical enlargement of said inner member, said outer member having a plurality of radial vanes projecting inwardly from the wall of said outer member, said outer member neck having radial apertures through which the skimmed milk is delivered, said nut having a hole through which the cream may be discharged, said inner bowl member having an impact turbine integrally formed with and below said conical enlargement, fluid nozzles for directing a stream of fluid against said turbine, a casing for the whole mounted on said column or support, said casing including a removable top having separate chambers into which the skimmed milk and cream are discharged and off-take spouts carried by said top for each of said chambers.

In testimony whereof I have signed my name to this specification in the presence of two subscribing witnesses.

MAX GOEHLER.

Witnesses:
ROWLAND BRITTAIN,
MAY WHYTE.